June 9, 1964 J. M. HOWE 3,136,990

VOLTAGE TO FREQUENCY CONVERTER

Filed Oct. 29, 1962

INVENTOR.
JAMES M. HOWE

BY

ATTORNEYS

United States Patent Office 3,136,990
Patented June 9, 1964

3,136,990

VOLTAGE TO FREQUENCY CONVERTER

James M. Howe, San Diego, Calif., assignor to the United States of America as represented by the Secretary of the Navy Filed Oct. 29, 1962, Ser. No. 233,980
3 Claims. (Cl. 340—347)
(Granted under Title 35, U.S. Code (1952), sec. 266)

The invention described herein may be manufactured and used by or for the Government of the United States of America for governmental purposes without the payment of any royalties thereon or therefor.

This invention relates generally to a voltage-controlled variable frequency generator.

In many applications, it is more desirable to have signal intelligence in the form of a signal of a fixed frequency rather than a signal of a fixed magnitude. Telemetry and magnetic recording are but two examples of applications where it is more desirable to have the signal intelligence in the form of a signal of a varying frequency rather than a signal of a varying magnitude. The intelligence can be more accurately retrieved because amplitude variations in the transmission or recording processes do not effect the recovery of the signal intelligence.

In general, prior voltage-to-frequency converters have employed voltage-tuned oscillators, for example, oscillators that are tuned by reactance type modulators. These converters are unsatisfactory because they are often non-linear and they produce a quiescent output frequency.

It is an object of the present invention to provide a new and improved voltage-to-frequency converter.

It is another object of the present invention to provide a voltage-to-frequency converter which is linear in operation over a relatively large range of input signals.

It is an object of the present invention to provide a voltage-to-frequency converter which produces no quiescent frequency.

It is an advantage of the present invention that it is suitable for telemetering and analog-to-digital conversion applications.

It is a further object of the present invention to provide a transistorized voltage-to-frequency converter.

It is a feature of the present invention that it is suitable for pulse counting.

It is an advantage of the present invention that it may be used in a servo system to convert an analog error signal to a digital output.

Figure 1:
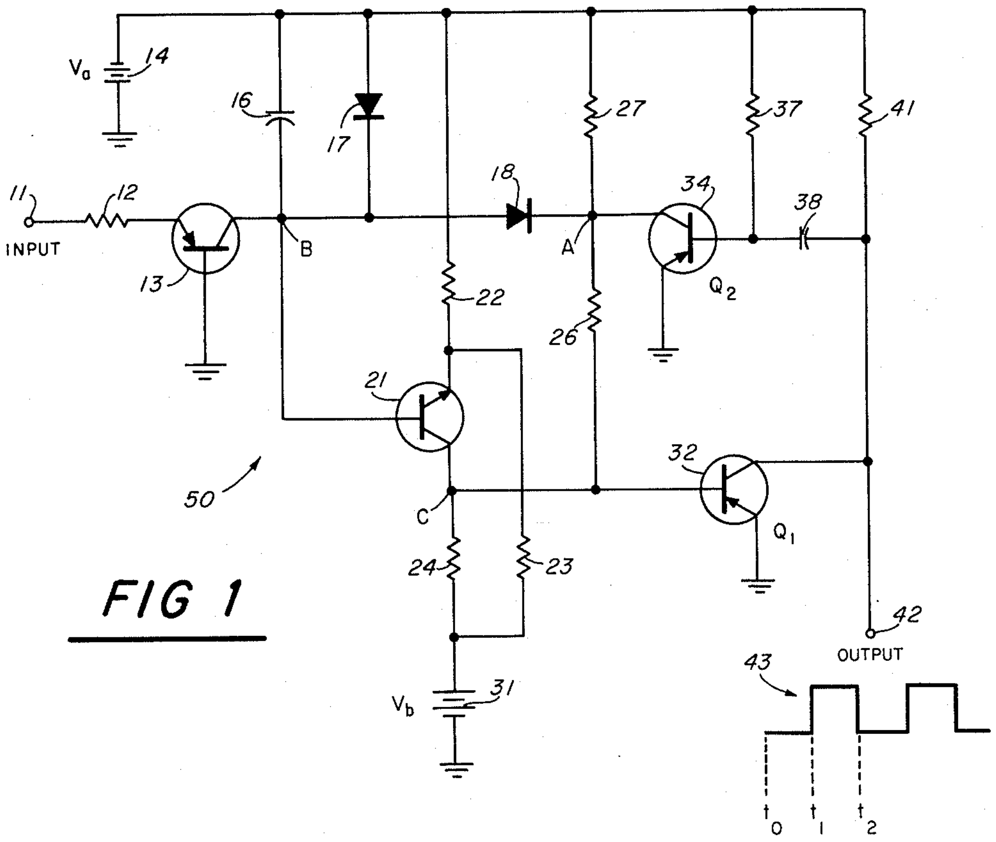
Figure 2:
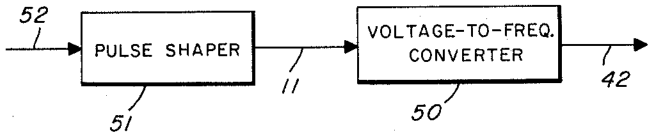

These and other objects, features and advantages of the invention will be apparent from the study of the following specifications, read in connection with the accompanying drawings, wherein:

FIG. 1 is a schematic diagram of a converter in accordance with the invention; and FIG. 2 is a block diagram of a counter in accordance with the invention.

Referring now to FIG. 1, resistor 12 is connected between input voltage terminal 11 and the emitter of PNP transistor 13. The base of the transistor is grounded and the collector of transistor 13 is connected to one terminal of capacitor 16, the cathode of diode 17, the anode of diode 18 and the base of NPN transistor 21. The emitter of NPN transistor 21 is connected to resistors 22 and 23. The collector of transistor 21 is connected to resistor 24, resistor 26 and the base of PNP transistor 32. The negative terminal of D.-C. voltage source 14, generating potential $V_a$, is connected to capacitor 16 and the anode of diode 17. The positive terminal is grounded. D.-C. voltage source 31, generating potential $V_b$ is connected between ground and the junction of resistors 23 and 24. The negative terminal is grounded. The resistors 22 and 23 form a voltage divider to provide the emitter bias for transistor 21. Serially-connected resistors 24, 26 and 27 also serve as voltage dividers to provide the bias voltage for the base of PNP transistor 32. The emitters of transistors 32 and 34 are grounded. The base of PNP transistor 34 is connected to resistor 37 and capacitor 38. The collector of PNP transistor 32 is connected to output terminal 42, capacitor 38 and resistor 41. The anode of diode 17 is connected to capacitor 16, resistor 22, resistor 27, resistor 37, and resistor 41.

In the quiescent condition with no input voltage on terminal 11, voltage source 14 provides the collector bias voltage for transistors 34 and 32, and voltage source 31 provides the collector bias voltage for transistor 21. The reverse bias provided by voltage source 31 maintains transistor 32 cutoff. Transistor 34 is in saturation and the potential at point A is effectively zero or ground. The base-emitter junction of transistor 21 is reversed-biased and the transistor is cutoff. Capacitor 16 is attempting to charge toward ground or zero potential through transistor 13, transistor 21 and through the back resistance of diode 18. All of the charge of capacitor 16 is being leaked off by the back resistance of diode 17 as the leakage of diode 17 is slightly in excess of the leakage through diode 18 plus the leakage through transistor 13 and transistor 21. As the charge across capacitor 16 is leaked off by diode 17, the base-emitter junction of transistor 21 never becomes forward biased and transistor 21 remains cutoff. As transistor 32 is cutoff, the potential at the collector of transistor 32 and at output terminal 42 is potential $V_a$.

When a positive voltage is applied to input terminal 11, the base-emitter junction of transistor 13 is forward biased and transistor 13 begins to conduit. As the charging rate of capacitor 16 now exceeds the leakage rate of diode 17, point B goes toward ground and becomes more positive. When the potential at point B finally exceeds the potential on the emitter of transistor 21, the base-emitter junction is forward biased and transistor 21 (which is cutoff in the quiescent condition) begins to conduct. When transistor 21 conducts the negative voltage created at point C is coupled directly to the base of transistor 32 and transistor 32 begins to conduct. The negative voltage at the collector of transistor 32 becomes more positive and a positive-going voltage is coupled through capacitor 38 to the base of transistor 34. This decreases the forward-bias, and the base current and the collector current of the transistor begin to decrease. The collector voltage of transistor 34 increases negatively. This negative potential excursion is transferred to the base of transistor 32 by means of resistor 26 making the base even more negative. This regenerative action results in rapid changes in transistors 32 and 34. It forces transistor 32 into the saturation region and cuts off transistor 34. With the collector voltage of transistor 34 now more negative than it was when the transistor was saturated, capacitor 16 is free to discharge through diode 18 and resistor 27.

The base of transistor 34 is nearly at ground in the quiescent condition. With transistor 34 cutoff and transistor 32 saturated, capacitor 38 now discharges through resistor 37 and resistor 41. When the base of transistor 34 becomes slightly negative the base-emitter junction of transistor 34 is forward biased and transistor 34 again conducts. The potential on the collector of transistor 34 increases in a positive direction and a positive-going voltage is coupled through resistor 26 to the base of transistor 32. The positive pulse draws transistor 32 into the cutoff region and the collector voltage of transistor 32 once again is a negative voltage having a potential $V_a$. Transistors 32 and 34 function in the same manner as the active elements in a monostable multivibrator. This stable condition, wherein transistor 32 is cutoff and transistor 34 is saturated, maintains itself until capacitor 16 builds up sufficient charge to once again trigger transistor 32. Then then cycle repeats. Every time transistor 32 is triggered, a pulse is produced at output terminal 42. Of course, the charing rate of capacitor 16 increases as the magnitude of the input signal increases. The input D.-C. voltage may be continuous or variable. The repetition rate of the output pulses is linearly proportional to the magnitude of the input signal. The waveform of the output signal 43 produced at output terminal 42 is substantially a rectangular wave. Capacitor 16 is charging between times $t_0$ and $t_1$. At time $t_1$ transistor 21 begins to conduct and capacitor 16 starts to discharge. At time $t_2$ transistor 32 switches from operation in the saturation region to operation in the cutoff region. The time constant of the discharge path including the resistor 37 and capacitor 38 is made longer than the time constant of the discharge path including capacitor 16, diode 18 and resistor 27. This is done to enable capacitor 16 to discharge before transistor 32 switches state at time $t_2$.

As the magnitude of the input voltage is increased, capacitor 16 charges more rapidly and as a result transistor 21 fires sooner. Therefore, the frequency of output pulses is increased as the magnitude of the input voltage is increased. The relationship between the magnitude of input voltage and output frequency is linear. When the input signal is zero volts potential, the output frequency is zero. There is a small null region between zero input volts and a fixed voltage level wherein the output frequency remains zero. This region may be used to advantage when the subject invention is employed in a servo system. For example, the voltage-to-frequency converter 50 may be used to convert an analog error signal to a digital signal used to drive a digital motor. Once the analog error drops below the above-mentioned fixed voltage level, the motor will not hunt. The converter 50 may be made to produce an output frequency under quiescent conditions if the input terminal 11 is biased with a positive voltage or diode 17 is removed. If diode 17 is removed, a charge can eventually build up on capacitor 16 and cause transistor 21 to fire. Thus, pulses will be generated at terminal 42 even though no input signal is present at input terminal 11.

The apparatus illustrated in FIG. 1 is responsive only to input signals having a positive polarity. If minor changes are made in the circuit the apparatus will produce output pulses when negative signals are applied to input terminal 11. If PNP transistors 13, 32 and 34 are replaced with NPN transistors, transistor 21 is replaced with a PNP transistor, the connections of diodes 17 and 18 are reversed and the polarities of voltage sources 14 and 31 are reversed, the apparatus will be responsive to negative input signals and produce pulses in response thereto. A voltage-to-frequency converter that is responsive to positive input signals may be connected back-to-back with a voltage-to-frequency converter that is responsive to negative input signals. Then output pulses will be produced regardless of the polarity of the input signal. Such a back-to-back circuit may be used advantageously in a servo system wherein the analog error signal may be positive or negative.

Capacitor 16 is part of a network that integrates the input signal. No output pulse is produced at output terminal 42 until a pulse (or pulses) of sufficient amplitude and duration are impressed on input terminal 11, only then will capacitor 16 charge up to a sufficient voltage to trigger transistor 21 into conduction. FIG. 2 depicts a pulse counter in accordance with the present invention. Random pulses applied to input 52 are shaped by pulse shaper 51 so that all pulses entering input 11 of voltage-to-frequency converter 50 are identical. The charging rate of capacitor 16 in the converter is adjusted so that $x$ number of pulses from shaper 51 are required to trigger transistor 21. Thus, one output pulse is produced at output 42 for every $x$ pulses that enter input 52 and the apparatus functions as a $1/x$ counter or divider.

Obviously many modifications and variations of the present invention are possible in the light of the above teachings. It is, therefore, to be understood that within the scope of the appended claims the invention may be practiced otherwise than as specifically described.

What is claimed is:

1. In combination in an analog to digital converter,
an integrating condenser,
a charging circuit comprising the controlled path of a transistor and a fixed bias source connected across said condenser, the controlling circuit of said transistor being connected to the analog voltage source to be converted,
a discharging circuit comprising a switching diode connected across said condenser,
means for normally reversely biasing said diode to off conditions during the charging of said condenser,
means for selectively forwardly biasing said diode to on condition to discharge said condenser, said means comprising a monostable multivibrator for alternately generating a normal stable voltage and an unstable voltage, an output of said multivibrator being polarized and applied to said diode to turn on said diode and discharge said condenser during periods of said unstable voltage, and
means coupled between the control circuit of said multivibrator and said condenser to trigger said multivibrator from the stable to the unstable state when said condenser is charged to a predetermined voltage.

2. In combination in an analog to digital converter,
a storage condenser,
a charging circuit comprising the controlled path of a transistor and a fixed biasing source connected across said condenser,
the controlling circuit of said transistor being connected to the analog voltage to be converted,
a discharge circuit comprising a switch means connected across said condenser,
means for normally holding said switch means open to permit charging of said condenser,
means for selectively closing said switch means to permit discharging of said condenser, said means comprising a monostable multivibrator for generating a normal stable voltage and an unstable voltage, an output of said multivibrator being applied to said switch means to operate said switch means in response to said stable and unstable voltages, and
means coupled between the control circuit of said multivibrator and said condenser to trigger said multivibrator when said condenser is charged to a predetermined voltage whereby the frequency of operation of said multivibrator is a function of said analog voltage.

3. In combination in a system for converting an analog voltage to a series of pulses the frequency of which is a linear function of said voltage,
an integrating condenser with a fixed relatively high resistance connected across the condenser,
a charging circuit for said condenser comprising a fixed bias source and the emitter-controlled constant-current path of the base-collector circuit of a transistor connected across said condenser, the emitter-base circuit of said transistor being coupled to the analog voltage to be converted, a diode switch connected across said condenser for selectively discharging said condenser, a multivibrator, one output of said multivibrator being connected to said switch means for alternately opening and closing said switch means in response to the stable and unstable voltages, respectively, at said output, a voltage comparator comprising a transistor with two control electrodes coupled respectively to said condenser and to said fixed bias source so that when said condenser voltages attain a predetermined level with respect to the fixed voltage a controlled current flows in the output circuit of said transistor, the trigger circuit of said multivibrator being coupled to the output of said transistor so that when said condenser has charged to a predetermined level, the time of which is determined by the current of said controlled path, the comparator output current of said comparator triggers said multivibrator to in turn operate said diode switch.

References Cited in the file of this patent

UNITED STATES PATENTS 2,957,943 Rack ------------------- Oct. 25, 1960